United States Patent
Ruetenik

(10) Patent No.: US 7,178,321 B2
(45) Date of Patent: Feb. 20, 2007

(54) SLIP-ON ANIMAL HOOF BOOT ASSEMBLY

(76) Inventor: Monty Ruetenik, P.O. Box 487, Kemah, TX (US) 77567

( * ) Notice: Subject to any disclaimer, the term of this patent is extended or adjusted under 35 U.S.C. 154(b) by 0 days.

(21) Appl. No.: 10/926,771

(22) Filed: Aug. 26, 2004

(65) Prior Publication Data

US 2005/0072128 A1  Apr. 7, 2005

Related U.S. Application Data

(60) Provisional application No. 60/508,775, filed on Sep. 4, 2003.

(51) Int. Cl.
*B68C 5/00* (2006.01)
*A01L 7/02* (2006.01)

(52) U.S. Cl. ............... 54/82; 168/14; 168/28

(58) Field of Classification Search ......... 168/12, 168/14, 16, 18, 24, 26, 28; 54/82; 36/111
See application file for complete search history.

(56) References Cited

U.S. PATENT DOCUMENTS

| | | | |
|---|---|---|---|
| 2,191,834 A * | 2/1940 | Slack | 168/28 |
| 4,122,900 A * | 10/1978 | Barr et al. | 168/12 |
| 4,444,269 A | 4/1984 | Laurent | |
| 4,470,466 A | 9/1984 | Nakanishi | |
| 4,513,825 A * | 4/1985 | Murphy | 168/12 |
| 4,548,026 A | 10/1985 | Shidner | |
| 4,736,800 A | 4/1988 | Rohner | |
| 4,794,991 A * | 1/1989 | Honderich | 168/26 |
| 4,981,010 A | 1/1991 | Orza et al. | |
| 5,172,766 A * | 12/1992 | Adkins | 168/14 |
| 5,224,549 A * | 7/1993 | Lightner | 168/18 |
| 5,348,098 A | 9/1994 | Di Giulio | |
| 5,505,264 A | 4/1996 | Morris et al. | |
| 5,706,898 A | 1/1998 | Beadle | |
| 5,727,633 A | 3/1998 | Ovnicek | |
| 5,871,054 A | 2/1999 | Bloom | |
| 6,062,008 A * | 5/2000 | Nor | 54/82 |
| D478,694 S * | 8/2003 | Kriesel et al. | D30/146 |
| D479,021 S * | 8/2003 | Kriesel et al. | D30/146 |
| 6,694,713 B1 * | 2/2004 | MacDonald | 54/82 |
| 6,761,224 B2 * | 7/2004 | McLane | 168/14 |
| 6,868,656 B2 * | 3/2005 | Osha et al. | 54/82 |

* cited by examiner

*Primary Examiner*—Son T. Nguyen
(74) *Attorney, Agent, or Firm*—Douglas Baldwin

(57) ABSTRACT

An improved animal hoof boot assembly that consists of a fabric boot and a critically dimensioned elliptical shock absorbing pad disposed inside at the bottom of the boot, the pad having a triangular raised frog support at the rear of a hoof stop at the front. The invention is also a method of transporting animals by fitting them with a boot assembly as described above.

20 Claims, 4 Drawing Sheets

SLIP-ON ANIMAL HOOF BOOT ASSEMBLY

RELATED APPLICATIONS

This application is based upon and claims priority to the date of Provisional Application Ser. No. 60/508,775, Filed Sep. 4, 2003.

BACKGROUND

1. Field of the Invention

The present invention relates to a boot and pad assembly for hoofed animals. More specifically, it relates to a unique slip on boot assembly consisting of a boot and pad to reduce stress on the legs and tendons of animals, particularly horses, during transport.

2. Discussion

People have long attempted to protect the hoofs of animals with protective devices of various sorts. Steel or aluminum shoes have been used to protect the hoofs from damage while the animal is walking or running. In recent years many animal hoof shock absorbing pads and shoes have also been proposed. Some of these shock-adsorbing shoes consist of pads attached to the hoof by means of a more or less conventional metal shoe. Others are attached by adhesives or held in place by specially designed boots. See for example U.S. Pat. No. 4,470,466, Sep. 11, 1984, U.S. Pat. No. 4,444,269 Apr. 24, 1984, and U.S. Pat. No. 4,981.010, Jan. 1 1991. Some pads described in the patent literature are directed to the treatment of laminitis or to correct injured or anatomically incorrect hoofs. Many of the proposed pads have some means of support for the frog of the animal's hoof, e.g. see U.S. Pat. No. 5,706,898, Jan. 13, 1998.

The present invention is a boot assembly that is directed to a different problem. Race and show horses are constantly being transported and are therefore standing for long periods of time on hard and unnatural surfaces. Not only horses but also other hoofed animals are also transported for sports racing, showing or breeding. For example, in some parts of the world camel racing is popular. Cattle are also transported for show and breeding. Traveling by roadway or air subjects the animal's legs to constant vibration and jolting, putting stress on the animal's legs, tendons and joints.

Aspects of the novel boot assembly of the present invention were described in a previous Provisional Application, 60/348,295, filed Oct. 22, 2001. As result of trial use of certain embodiments of the previous invention, I have discovered significant and critical improvements. Those improved embodiments are described in this application.

SUMMARY OF THE INVENTION

This invention is an improved slip-on hoof boot assembly that consist of a fabric boot and a critically dimensioned elliptical hoof pad disposed inside and at the bottom of the fabric boot.

The hoof boot assembly consists of a shock absorbing material, preferably a polymeric elastomer, and an anatomically correct boot constructed of sturdy fabric designed to be easily fitted on the hoof of an animal.

DESCRIPTION OF PREFERRED EMBODIMENTS

This invention is a slip on hoof boot assembly that comprises a fabric boot and a hoof pad that is disposed inside and at the bottom of the boot.

The Pad

Figure 2:
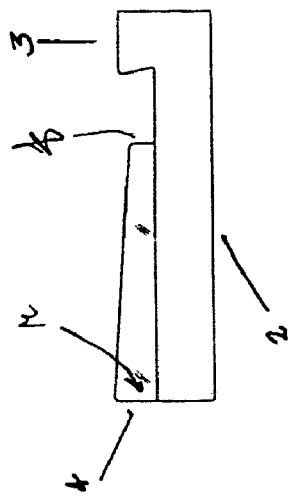
FIG. 2 is a side view of a hoof pad of the present invention.
Figure 3:
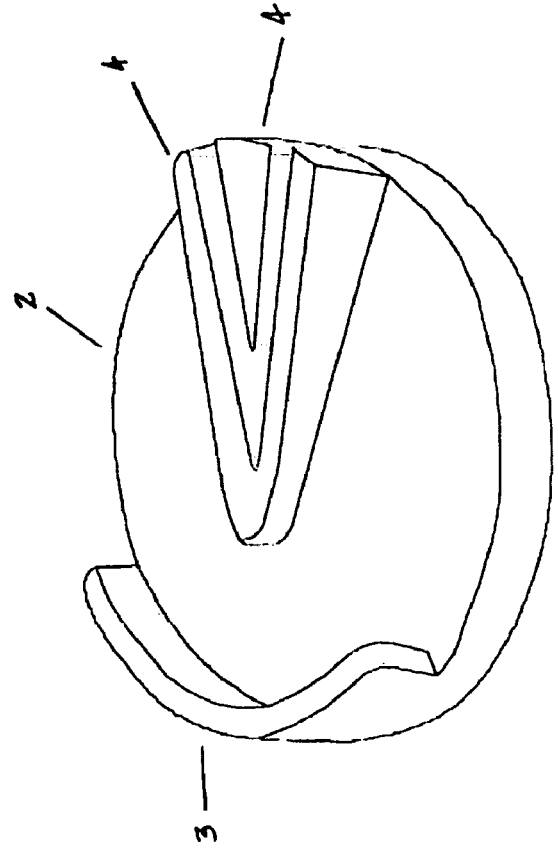
FIG. 3 is an isomeric view of a hoof pad of the present invention.
Figure 1:
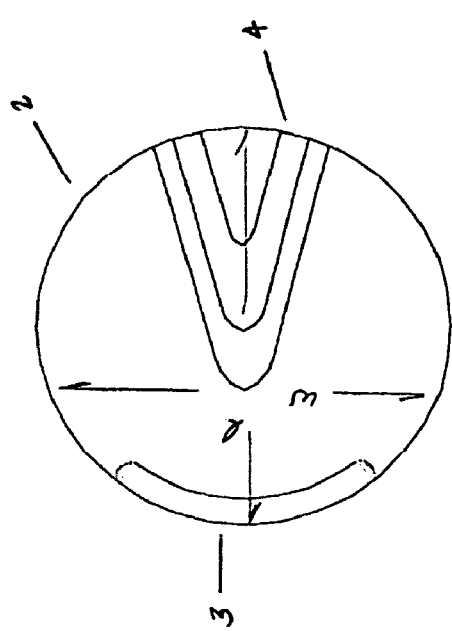
FIG. 1 is a top view of a hoof pad of the present invention.
Figure 4:
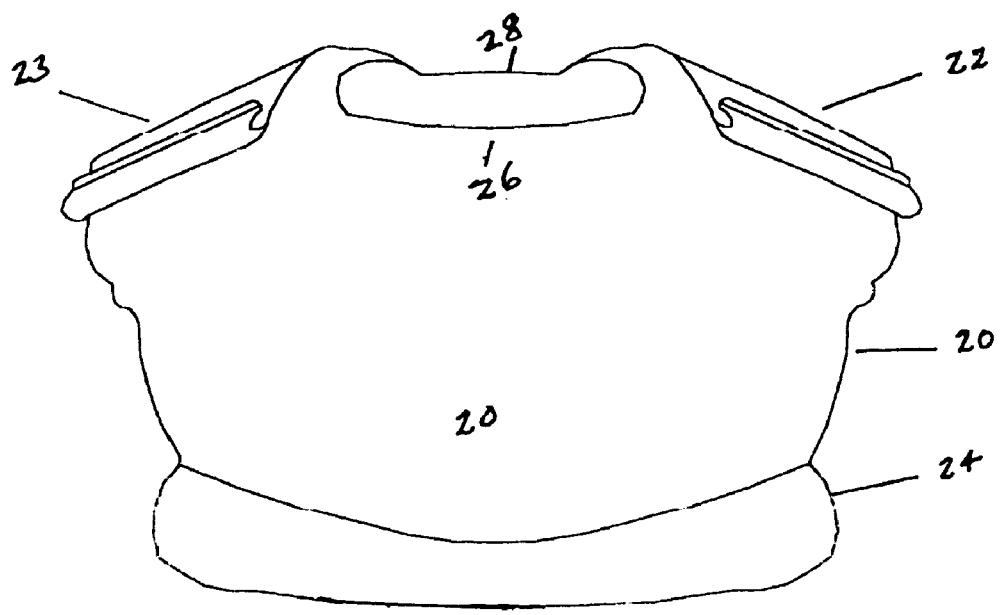
FIG. 4 is a front view of a hoof boot of the present invention.
Figure 5:
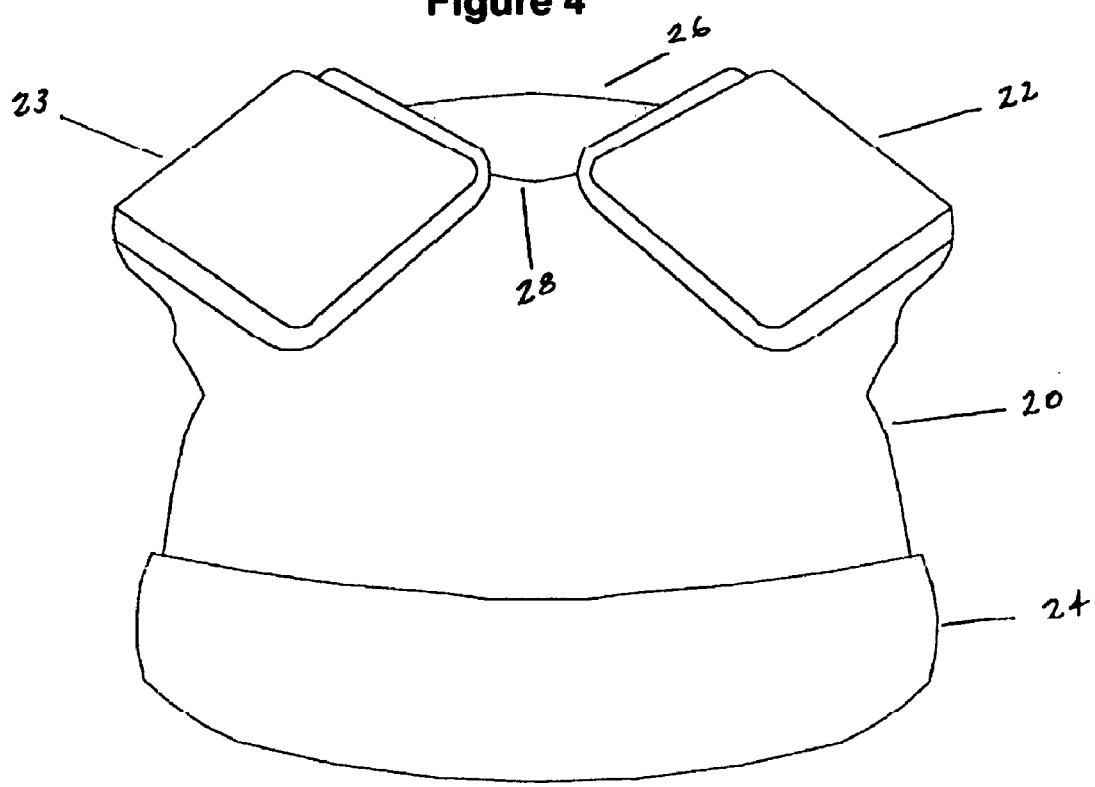
FIG. 5 is a rear view of a hoof boot of the present invention.

Referring to the drawings, FIGS. 1 to 3 illustrate an embodiment of an elastomeric hoof pad (1) according to the present invention. The base (2) is generally shaped to approximate the shape of the animal's hoof print. This pad, made of shock absorbing material can be easily trimmed to conform to the hoof of the individual animal on which it will be used. The base may be from about 0.25 to 2 inches in thickness. Thickness of from about 0.25 to 0.75 inches works well for horses when using a polyurethane elastomer as the shock absorbing material. In one embodiment, the base is tapered from back to front with the back being from about 1.0 to 1.5 times the thickness of the base. In one preferred embodiment the base will be about one (1) inch thick in back and about 0.5 inch thick in front. Such a tapered base is useful for pads for horses that suffer from laminitis where it is desirable to have the hoof tilted forward to relieve separation of the laminae. See U.S. Pat. No. 5,706,898.

The base (2) has a ridge that acts as a stop (3) on the front side of the base. This is to prevent the hoof from slipping to far forward in use. The front ridge (3) of the pad is critically important to prevent the front of the hoof from protruding excessively forward. This helps to keep the hoof positioned correctly over the triangular frog support during use. For pads larger than six (6) inches across, the ridge must be at least 0.60 inches above the sole of the pad. it is preferred that it be about 0.75 inches above the sole plate. For smaller pads, of less than six (6) inches across, the ridge must be at least 0.375 to 0.5 inches above the sole. The front ridge should be at least 10% of the circumference of the base centered on a point in the front of the base. It may be as much as 60% of the circumference but about 25 to 35% is preferred. The front ridge is preferably made from the same material as the base and may be molded as a single piece.

On the backside of the base, opposite the stop, is the frog support (4). This is a triangular projection above the surface of the base. This triangular projection is designed to approximately correspond to the shape and location of the frog of a horse's hoof. It has been found that the height of the frog support from the sole is very important to provide adequate uniform pressure as well as cushioning of the hoof. This frog support provides increased blood flow to the leg of the animal. The height at the rear ("r" in FIG. 2) must be at least 0.5 inches from the sole for larger pads (above six (6) inches across) and at least 0.375 inches above the sole for smaller pads (up to six (6) inches across). The front of the frog support ("f" in FIG. 2) must be at least 0.15 inches above the sole of the pad and may be between 0.15 to 0.25 inches. A height of 0.175 to 0.195 is preferred and for many applications a height of 0.1875 is ideal. The height of the frog support projection above the base at the rear of the triangle in relation to the height at the front of the triangle [the small end or apex of the triangle] is in the ratio of between 2/1 to 5/1. For, example if the height of the projection at the rear of the triangle is 0.45 inches above the surface of the pad and the height at the apex of the triangle is 0.15 inches, the ratio is 3/1. The function of the triangle projection is to contact the frog during travel, to provide a kind of massage to the frog of the hoof. Thus, blood circulation is stimulated and stress on the animal's legs and tendons are relieved. It is well known that the frog acts somewhat as a blood pump. See for example, U.S. Pat. No. 4,981,010 where it is stated "The horny frog (58) is very elastic and acts as a shock absorber and as a second heart to the horse. As the hoof is pressed against the ground, old blood is forced up and out of the foot. When the hoof is lifted off the ground, the elastic frog (58) springs back, letting new blood into the foot." The frog support of the present invention aids in this blood circulation.

The frog support may be concentric triangles, as shown in FIGS. 1–3, or may be a single triangle. It is preferred that the support be of softer material (lower Shore A hardness) than the base material. With concentric triangles—two or more—the support may also be made of the same material as the base and may be molded as a single piece, but it may also be made of a material of different hardness, preferable softer. It may be molded together with the base, thus avoiding a separate step of adhering it to the base. If the support is not molded of the same material as the base or molded to the base, it is attached to the base by a suitable adhesive such as an epoxy or polyurethane adhesive. A suitable means of attaching the softer frog support is to mold the support to the harder base before the base is fully cured. For example, the base is poured into a mold and allowed to partially set then the frog support projection is poured into a second mold appropriately placed on top of the partially cured base, allowing the parts to bond together. Other suitable means and variations will be apparent to those skilled in the art.

It is the burden of the pad base to supply the bulk of the support for the animal. The frog support is an aid to stimulation of the frog and is not the principal means of supporting the hoof. In this way, the present invention differs from previous frog support shoes or pads.

It has been found that the shape of the pad is of special importance. Round pads have been found to not perform well in actual use; they tend to rotate in the boot. An elliptical shaped insert is required to maintain consistent fit and to prevent rotation in the shoe in use. In FIG. 1 is shown a diagram of a pad of this invention showing the length (l) and width (w) of the pad. Pads made for use on larger horses are more than six (6) inches from side to side, the ratio of the length (l) to width (w), that is the l/w, should be at least 1.1 to 1.25 and preferably about 1.14 to 1.18. An ideal ratio is about 1.15. Pads for smaller horses, less than six (6) inches across are more rounded and will have an l/w ratio of 1.02 to about 1.15. Overall the l/w ration should be between 1 and 1.25.

The base is made of any suitable elastomeric polymer material that provides flexibility, shock absorbency, some degree of elasticity, resilience and has dimensional stability. In a preferred embodiment, the base is constructed of a casting polyurethane elastomer. For example polyurethane-casting elastomer having a Shore A hardness of from about 10 to about 70 is suitable. It is preferred that the base be of about 20 to 70 Shore A hardness and the support be of about 8 to 50 Shore A hardness. One material used in an embodiment of the invention is GTS-10 to GTS-40, a urethane casting elastomer available from Win-Tech Products Corp. P.O. Box 1114, Tomball, Tex., 77377.

The Boot

Figure 7:
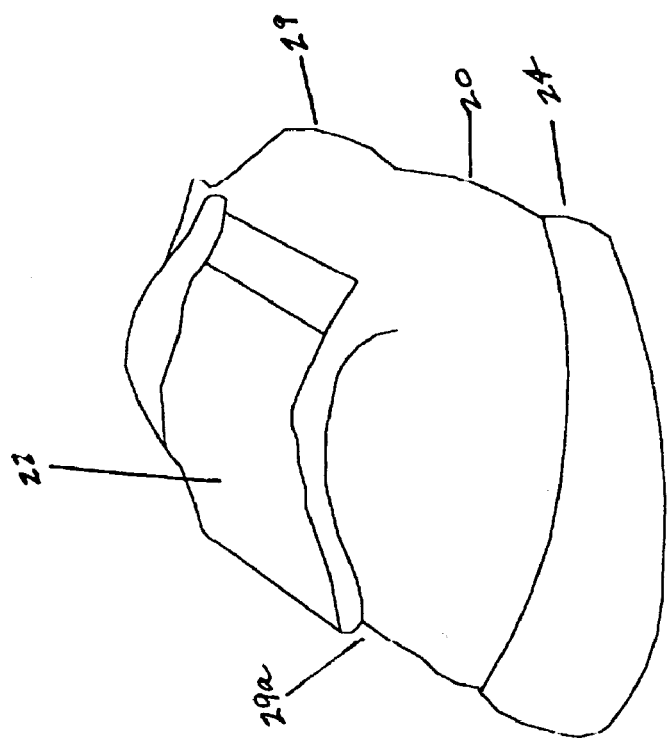
FIG. 7 is an isomeric view of the front side of a hoof boot of the present invention.
Figure 6:
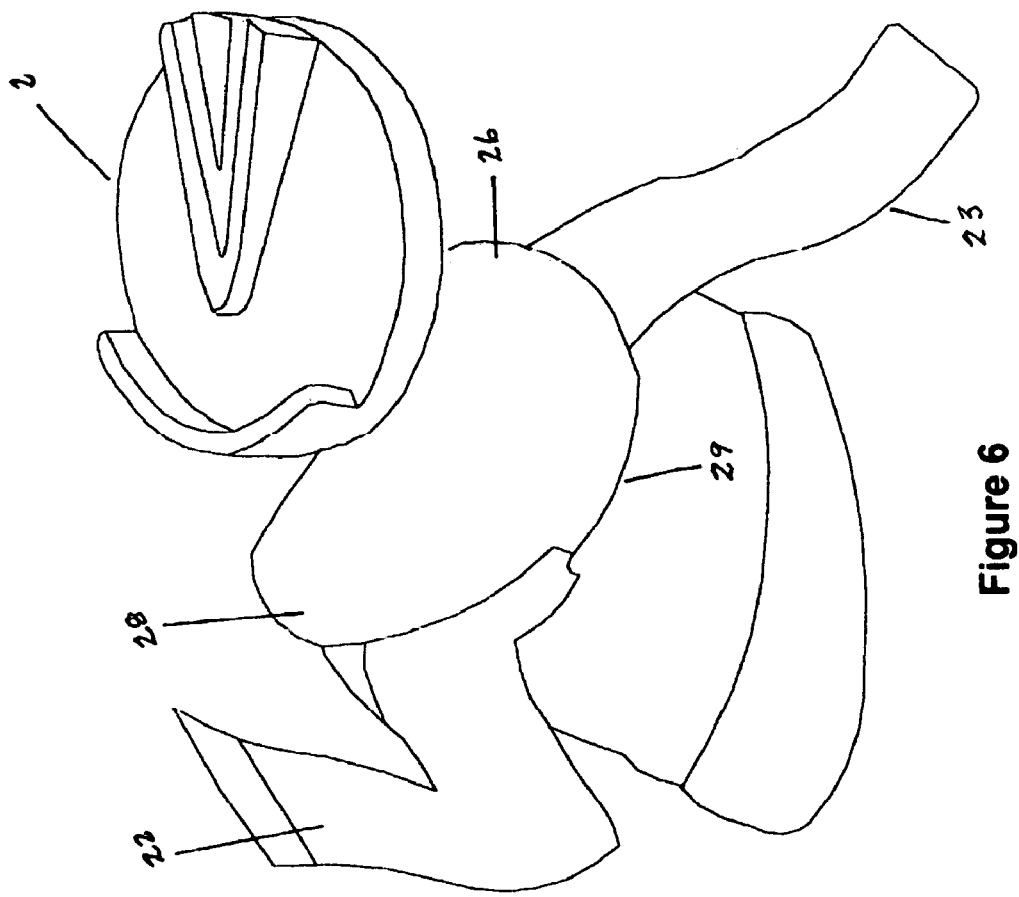
FIG. 6 is an isomeric view of a hoof boot of the present invention showing the way in which a hoof pad is inserted into the boot.
Figure 8:
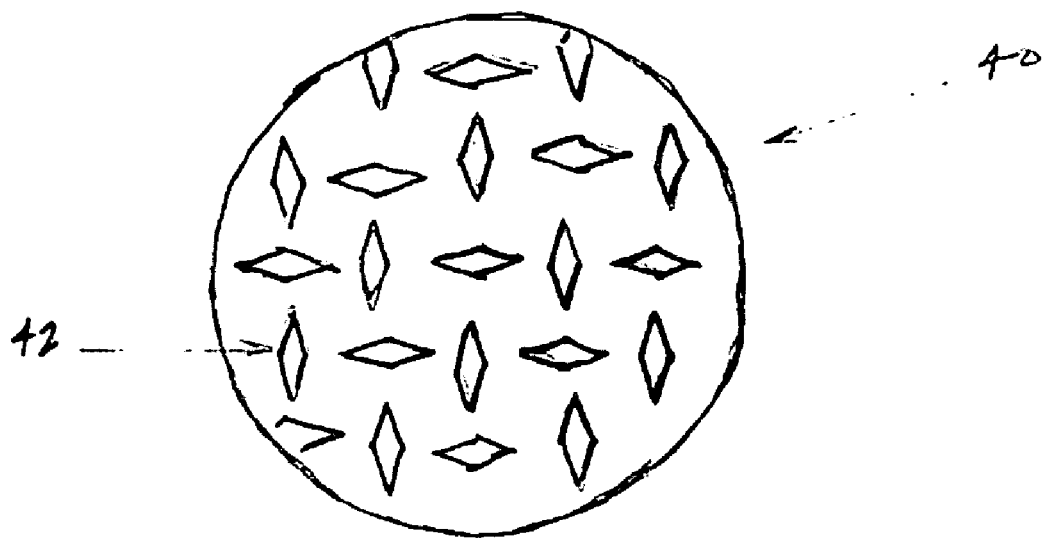
FIG. 8 is a schematic side view of a boot of the present invention.

The boot is shaped to fit snugly on the hoof of an animal when fastened. Referring to the drawings again, FIGS. 4 to 7 depict an embodiment of the invention. As seen in FIG. 7, the boot slopes from bottom to top on the front side to correspond to the slope of the animal's hoof. The angle of the slope as shown in FIG. 8 (alpha A) should be between 20 to 50 degrees. Preferably the angle will be from 30 to 50 degrees and a 45-degree angle has been found very suitable.

The boot consists of a body (20) having a sole (24), side slits for opening (29) and (29a), and closure flaps (22) and (23). The size of the boot will vary according to the size of the hoof and the kind of animal on which it will be used. Generally, for horses, the boot will be sized to accommodate a 4 to 8 inch diameter pad. The height from sole to the top will be sufficient to clear the hoof so the boot top may be secured around the leg above the coronary band and the bulbs of the heel of the animal. Equine boots will be from about three to eight inches in height. There are slits (29 and 29a) along the side of the boot to allow it to be opened for placing on the animal's hoof. The distance from the sole will be sufficient to secure the pad and the length of the slit will be sufficient to allow the boot to be opened to easily slip onto the hoof. For horse boots, the opening on the sides will ideally start about 1.5 to 3.0 inches from the sole and be about three to five inches in length.

When opened, the boot has a large opening (30) to allow it to be easily slipped onto the hoof. When closed, by attaching the flaps (22) and (23), the opening fits snugly around the leg of the animal. The flaps consist of a first set attached to the rear top of the boot that are attachable to a second set of flaps that are attached to the front top side of the boot by any convenient means. The attachment overlaps the front flaps over the rear flaps to secure the rear flap top and bottom. This gives a secure and reliable closure. They may also be buttoned, snapped or tied, but preferable are attached by hook and loop (for example Velcro®). It is preferred, although not illustrated in the drawings, that the front and rear tops of the boot at points (26) and (28) be padded. The padding is constructed by enclosing foam or closed cell rubber pad, inside a pouch of the fabric of the boot. Padding allows a closer and more secure fit around the animal's leg. The rear pad is above the bulbs of the hoof so that the boot does not rotate.

The sole plate (24 in FIGS. 4 to 7) is of special importance. The sole plate consists of a bottom plate (56 in FIG. 8 and sides (54) that extend upward on the lower side of the cloth boot. The sole plate bottom is preferably about 0.375 inches thick, but may be from 0.2 to 0.5 inches in thickness. The sole plate side (54 and 24) will extend up the lower portion of the cloth boot about 0.75 inches to about 2.25 inches, measured from the bottom of the sole plate surface. It is preferred that the extension be about 1 to 1.75 inches. Of course, this extension will be greater in the larger boots and less in the smaller boots. The sole plate is relatively rigid but not extremely hard. Since this plate is in contact with the transport surface or the ground, it is sturdy and waterproof. Simply coating the surface of the cloth boot will not have the necessary toughness to withstand the use environment. Additionally, the sole plate is preferably designed to prevent slippage on wet or slippery surfaces.

The sole plate is preferably molded of polymeric material or hard rubber (having the consistency and hardness to approximate automobile tires). Elastomers of the same type used for the pad base are suitable, as well as other polymeric materials. The sole plate is attached to the underside of the cloth boot. The attachment is preferably accomplished by a combination of adhesive and mechanical means, for example, the may be first attached by a suitable adhesive then sewn to the lower portion of the cloth boot.

Figure 9:
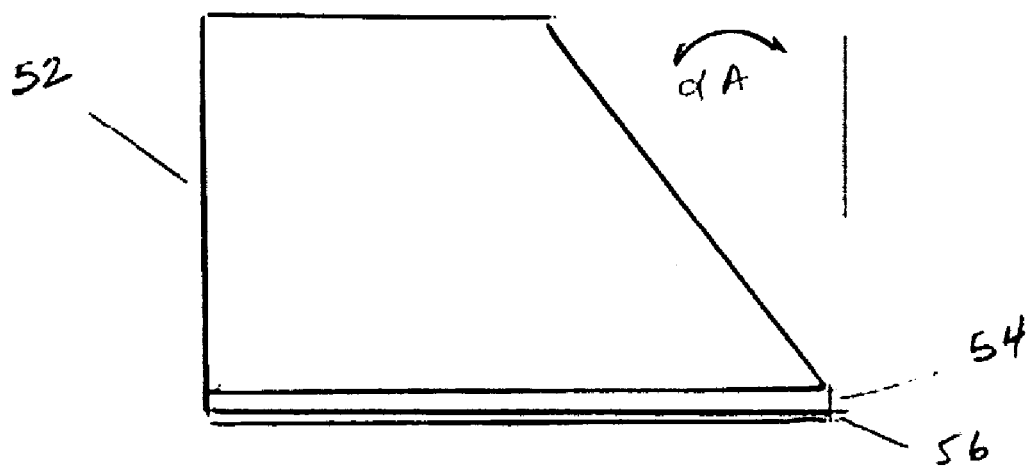
FIG. 9 is a bottom of a sole plate of the present invention.

The sole plate is preferably cleated on the bottom. FIG. 9 illustrates a suitable cleat pattern. The cleats (42) are about 1 inch in length and extend from the surface of the plate about 0.25 inches. The illustrated design is similar to a snow/mud tread on an automobile tire. The illustrated spacing between the cleats eliminates the hydrofoil effect. The cleat design is a reverse canted effect to enhance self-cleaning in muddy conditions. Other designs and cleat arrangement will be well within the skill on those in the art.

The boot may be made of any suitable fabric, woven or non-woven. A particularly suitable fabric is an 18 oz. Ballistic cloth used by the U.S. military for bags. A DuPont nylon woven fabric, CORDURA® that is available in several weights, may be used. The 330 denier fabric is preferred.

Animal Hoof Assembly Kit

In one embodiment this invention is a kit comprising a fabric boot as described above and a pad, as described above, specially adapted for use in the boot. The advantage of the kit is that the parts may be sold separately as original equipment or as replacement. For example if the boot or the pad wear out before the other, the appropriate kit part may be obtained without the necessity of purchasing the entire assembly. Also the kit may comprise a boot and a variety of specially adapted pads. For example, there may be pads with varied heights of the frog support projections.

Use of the Hoof Assembly

In operation, a suitable size and style pad is inserted into a suitable sized boot and slipped on the hoof of the animal. In some cases it may be desirable to have the pad attached to the inside base of the boot. Attachment maybe made permanent as with an adhesive, but it is preferred that the pad be removable. A suitable removable attachment is made by adhering hook and loop (e.g. Velcro®) fabric (hook to one and loop to the other) the inside bottom of the boot and to the underside of the pad. A Velcro® attachment has been found to work well in practice.

The boot assemblies are particularly suitable for use on animals during transport, but because they are carefully matched to the individual animal and securely attached, they may also be used in many other applications. In one embodiment this invention is a method of transporting animals. The animal to be transported is fitted with a boot assembly according to the disclosure herein and transported, by truck, by train or by airplane. It has been found that animal transported with a suitable boot assembly as described herein suffer far less stress and arrive more rested and in better condition than those transported otherwise.

The boot assemblies of this invention are valuable for use with injured hooves and for use on animals that are confined to small places with hard surfaces.

An additional and important application of the present invention is in the elimination of rotational torque on the leg ligaments, usually associated with exercising a horse on a standard small diameter walker. The elliptical shape of the pad, as well as the secure attachment of the pad to the bottom of the boot eliminates turning of the pad. The design on the boot was accomplished by observing the legs of horses when exercising on a "merry-go-round" walker. Most horsemen have found the use of a traditional merry go round type of walker, as an effective economical way to exercise and or cool horses after a workout. The pad having a soft subsurface, absorbs some of the rotational torque that normally would be stressing the anatomical structures of the horses leg. This is especially beneficial after a workout when the horse is already fatigued. The standard insert pad on a regular horseshoe, is too thick and breaks nails out of the hoof, hence dislodging the shoe. The cleated bottom of the present invention provides a safety surface (or solid footing) for the foot. The cleats eliminate slippage, which is especially important on physically fatigued equine ligaments and tendons after exercise and after a workout. Many other uses will occur to those skilled in the art, as will variations in materials and configuration, all within the scope of the present invention.

Treatment of Laminitis

In one embodiment the invention is a method for treatment of laminitis in horses. Laminitis in horses, as well as treatment options, including hoof frog support is well described in U.S. Pat. No. 5,706,898. The description and treatment options for laminitis of U.S. Pat. No. 5,706,898 are incorporated herein by reference. The method of the present invention comprises fitting a horse suffering with laminitis with a boot assembly as described above for sufficient time to reduce inflammation and keep pressure on the sole and frog of the hoof. For example, a horse suffering with laminitis may have a boot assembly, as described above, placed on him for a few hours each day. It is preferred to use a pad that is tapered from back to front. For example, the base will be about one (1) inch thick in back and about 0.5 inch thick in front.

The invention described herein may be embodied in other specific forms without departing from the spirit or essential characteristics thereof. The present embodiments considered in all respects as illustrative and are not restrictive, the scope of the invention being indicated by the appended claims, and all the changes that come within the meaning and range of equivalency of the claims are intended to be embraced therein.

I claim:

1. An animal hoof boot assembly comprising:
    a boot comprising a fabric body shaped to fit the hoof of an animal and of a height to reach above the hoof of animal for which it is designed and having a bottom, a bottom sole plate, side slits and closure flaps to secure the boot onto the hoof of an animal, and wherein the front side of the boot slopes from bottom to top and,
    a pad comprising (having) an elliptical shock absorbing base having a triangular projection at the rear of the pad above the top surface of the pad and a semi-circular projection above the surface of the top of the pad along the front circumference opposite the triangular projection to provide a stop for an animal hoof,
    wherein the pad is disposed in the boot so that the triangular projection is topmost so as to contact the frog area of an animal hoof placed into the boot.

2. The assembly of claim 1, wherein the fabric boot is between 4 to 8 inches in height at the rear and has a slope of between 20 to 50 degrees on its front side, and the base of the pad is between 0.25 to 2 inches thick, is made of an elastomeric material wherein the front semicircular projection is at least 10% of the circumstance of the base and projects at least 0.375 above the top surface of the base of the pad.

3. The hoof boot assembly of claim 2 wherein the bottom of the fabric boot and the pad are elliptical shape and the pad has a length, l, front to back relative to the animal to which it is intended, to width, h, ratio, l/h, of at least 1 to 1.25.

4. The hoof assembly of claim 3, wherein the pad thickness is tapered from front to rear with the rear thickness being 1to 1.5 times the thickness of the front side thickness of the pad.

5. The hoof boot assembly of claim 3 wherein the triangular projection of the pad is tapered from front to back and the back projects at least 0.375 inches above the surface of the base and the front projects at least 0.15 inches above the surface of the base of the pad.

6. The hoof boot assembly of claim 3 wherein the triangular projection comprises at least two parallel triangles.

7. The hoof boot assembly of claim 5 wherein the base pad is made of a polyurethane elastomer having a Shore A hardness of between 10 and 70 and the triangular projection has a Shore A hardness of between 8 and 50.

8. The hoof boot assembly of claim 3 wherein the boot has a sole plate attached to the bottom side of the fabric boot consisting of a bottom plate and sides that extend up the side of the fabric boot.

9. The hoof boot assembly of claim 8, wherein the sole plate is between 0.2 and 0.5 inches thick and the side extends up the side of the boot at least 0.75 inches.

10. The hoof boot assembly of claim 9 wherein the triangular projection of the pad is tapered from front to back and the back projects at least 0.375 inches above the surface of the base and the front projects at least 0.15 inches above the surface of the base of the pad.

11. The hoof boot assembly of claim 9 wherein the base pad is made of a polyurethane elastomer having a Shore A hardness of between 10 and 70 and the triangular projection has a Shore A hardness of between 8 and 50.

12. The hoof boot assembly of claim 11 wherein the pad thickness is tapered from front to rear with the rear thickness being 1.0 to 1.5 times the thickness of the front side thickness of the pad.

13. The hoof boot assembly of claim 11 wherein the boot has a sole plate attached to the bottom side of the fabric boot consisting of a bottom plate and sides that extend up the side of the fabric boot and the sole plate is cleated.

14. The hoof boot assembly of claim 3 wherein the sole plate is cleated.

15. A method of transporting horses comprising fitting the horse on its four hoofs with a hoof boot assembly comprising:

a boot comprising a fabric body shaped to fit the hoof of an animal, 4 to 8 inches in height at the rear and has a slope of between 20 to 50 degrees on its front side and having a bottom, a bottom sole plate, side slits and closure flaps to secure the boot onto the hoof of an animal, and wherein the front side of the boot slopes from bottom to top and, a pad comprising an elliptical shock absorbing base having a triangular projection at the rear of the pad above the top surface of the pad, wherein said triangular projection engages the frog of the hoof of the horse being transported, and a semi-circular projection above the surface of the top of the pad along the circumference opposite the triangular projection to provide a stop for an animal hoof.

16. The method of claim 15 wherein the sole plate of the boot is cleated and is between 0.2 and 0.5 inches thick and the side extends up the side of the boot at least 0.75 inches and wherein the pad has a length, l, front to back relative to the animal to which it is intended, to width, h, ratio, l/h, of at least 1 to 1.25.

17. The method of claim 15 wherein the base pad is made of a polyurethane elastomer having a Shore A hardness of between 10 and 70 and the triangular projection has a Shore A hardness of between 8 and 5 and the triangular projection is of a lower Shore A hardness value than that of the base material.

18. A pad for use in an animal hoof assembly, comprising an elliptical shock absorbing base having a triangular projection at the rear of the pad above the top surface of the pad, and a semi-circular projection above the surface of the top of the pad that extends along at least 10% of the circumference of the base opposite the triangular projection to provide a stop for an animal hoof and wherein the triangular projection of the pad is tapered from front to back and the back projects at least 0.375 inches above the surface of the base and the front projects at least 0.15 inches above the surface of the base of the pad.

19. The pad of claim 18 wherein the base pad is made of a polyurethane elastomer having a Shore A hardness of between 10 and 70 and the triangular projection has a Shore A hardness of between 8 and 5 and the triangular projection is of a lower Shore A hardness value than that of the base material.

20. The pad of claim 18 wherein the pad has a length, l, front to back relative to the animal to which it is intended, to width, h, ratio, l/h, of at least 1 to 1.25.

* * * * *